3,302,807
BALER DRAWN BALE ACCUMULATOR
AND STACKER
Calvin B. Blair, Box 76, Barnard, Kans. 67418
Filed Apr. 12, 1965, Ser. No. 447,379
11 Claims. (Cl. 214—42)

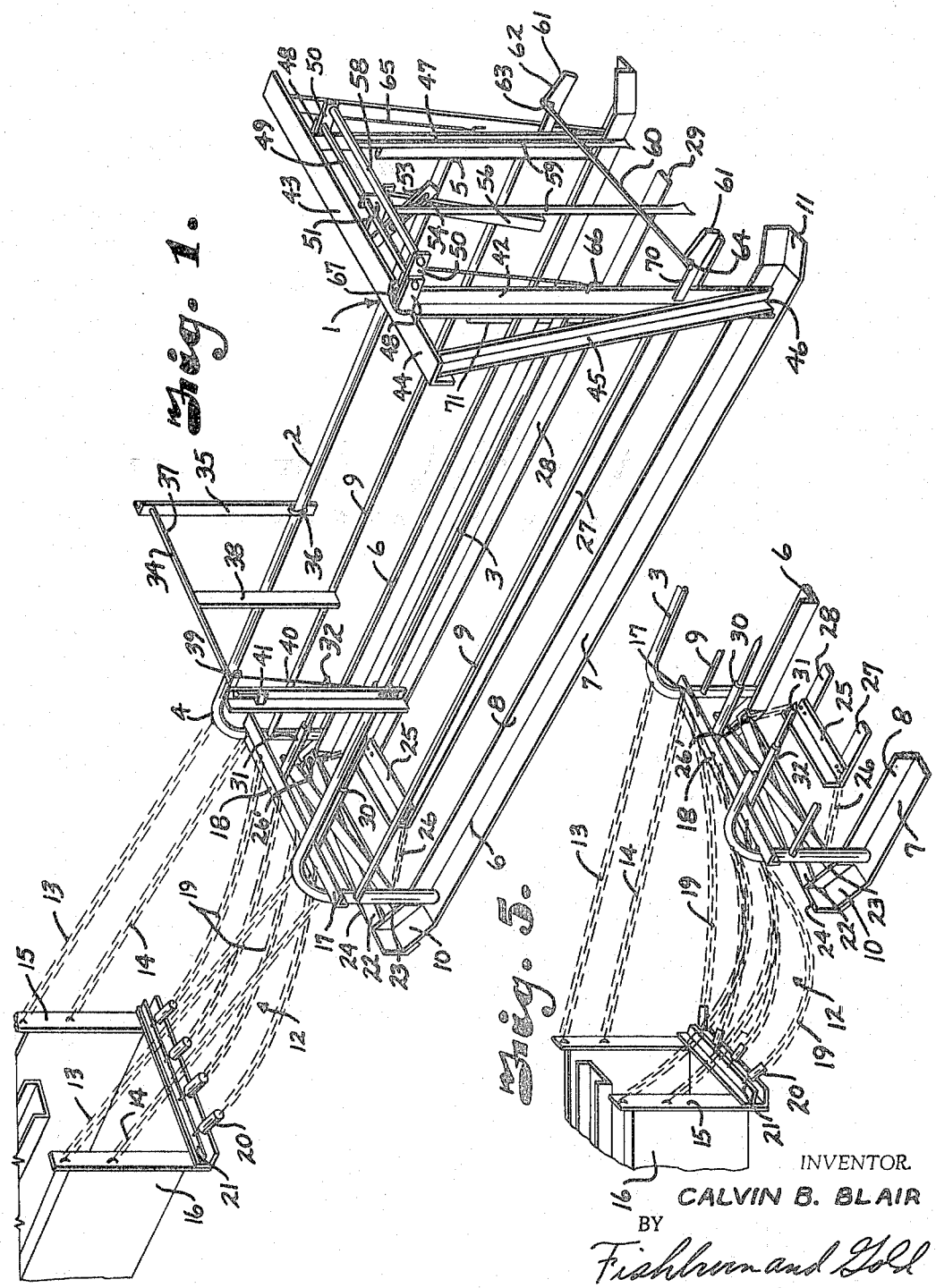

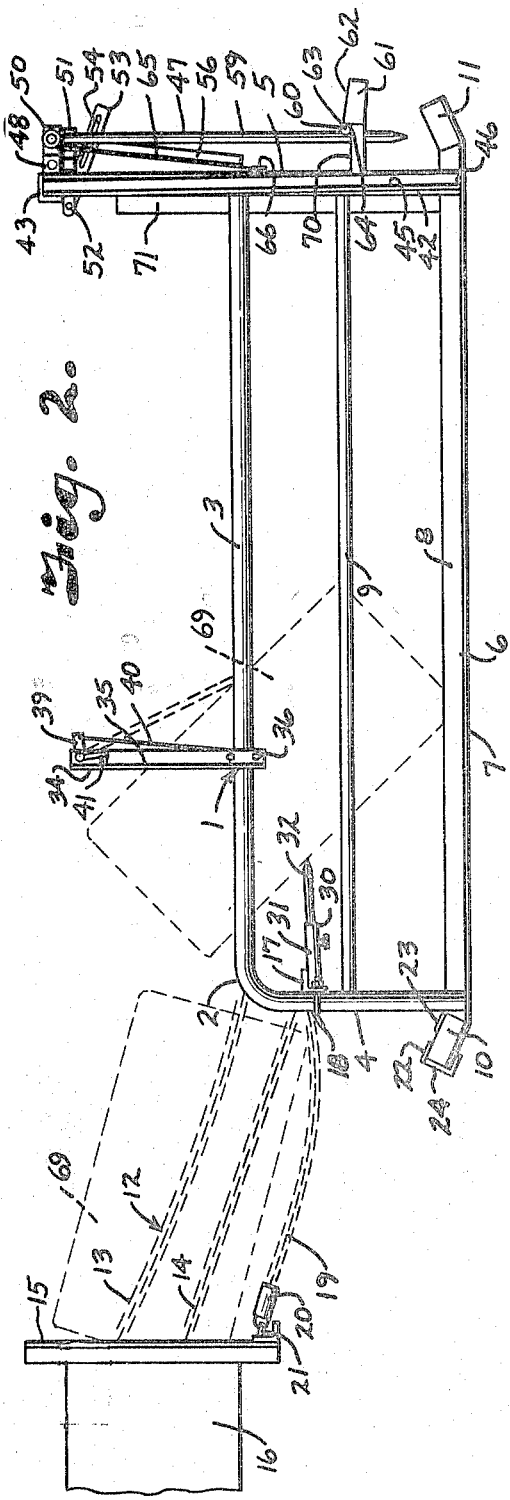

This invention relates to bale handling systems and more particularly to a baler drawn accumulator for stacking bales in small groups in the field for pickup.

The principal objects of the present invention are: to provide a bale accumulator adapted to be drawn by a mobile baler and which receives bales delivered by the baler and automatically deposits same upon the ground in stacked groups; to provide such an accumulator having a flexible hitch which reliably guides bales into the accumulator from the baler even when the baler is turning at sharp angles; to provide such a flexible hitch which delays entry of a bale into the accumulator to assure sufficient time for the accumulator gate to close after a group is deposited; to provide a bale accumulator having adjustable semi-rigid running straps to partially support bales on the ground to avoid excessive abrasion and yet permit sufficient ground friction with the bales to quickly empty the accumulator upon gate release; to provide such apparatus including bale positioning structure which guides the bales into the accumulator from the hitch and prevents the bale from standing on end in the accumulator; to provide such apparatus which lacks vertical intermediate side braces so as to eliminate any structure upon which bales may snag or hang up; to provide such a bale accumulator which requires no wheels or rotating parts for support in the field; to provide a rugged vertically opening rear gate which is sensitive and reliable for discharging the bales in groups under difficult operating conditions; and to provide such bale accumulating apparatus which is simple and inexpensive in in construction, and yet reliable, rugged and long-lived in use.

Other objects and advantages of this invention will become apparent from the following description taken in connection with the accompanying drawings wherein are set forth by way of illustration and example certain embodiments of this invention.

FIG. 1 is a perspective view of the accumulator showing the chain hitch secured to the chute of a rear discharge baler, bale positioning structure, running straps and the gate with trip mechanism therefor.

FIG. 2 is a side elevation of the accumulator showing further details of the various parts thereof.

FIG. 3 is a rear elevation of the accumulator showing additional details of the rear structure, gate and running straps.

FIG. 4 is a fregmentary side elevation of the accumulator showing the trip trigger and gate engaged with emerging stacked bales.

FIG. 5 is a fragmentary perspective view particularly illustrating the chain hitch during a sharp turn.

Referring to the drawings in more detail:

The reference numeral 1 generally indicates a bale acculator and stacker embodying this invention. The accumulator 1 comprises a frame 2 having upper elongated structural members 3 extending horizontally and parallel to each other in spaced apart relation between the front 4 and rear 5 of the accumulator. The structural members 3 are spaced apart a distance sufficient to loosely accommodate the width of a hay bale therebetween and extends downwardly at the front 4 terminating at ground level in fixed engagement with spaced apart skids 6. The skids 6 are composed of elongated angles having one leg 7 in running contact with the ground and the other leg 8 rising vertically on the inside of the frame 2 substantially in the respective vertical plane containing the particular structural member 3. An intermediate bar 9 extends horizontally parallel to and between each skid 6 and the respective structural member 3 forming a fence or side retainer for bales contained within the frame 2. Forward and rear extensions 10 and 11 are secured to the skids 6 and angle upwardly therefrom. The extensions 10 aid in causing the accumulator to rise over obstructions in the field when pulled forwardly during normal operation. The rear extensions 11 help guide the stacked bales emerging from the structure.

A flexible chain hitch 12 is comprised of upper and lower side chains 13 and 14 secured in vertically spaced apart relation to the upper forward portion of the structural members 3 so as to form flexible parallel side rails which are taut when the accumulator is being pulled forward in a straight line. The chains 13 and 14 normally slope upwardly from the forward portion of the structural members 3 and secured in the same spaced relation to the rear face 15 of the chute 16 of a rear discharge filed baler. The respective chains 13 and 14 are laterally spaced apart a distance whereby a bale ejected from the chute 16 is loosely retained against lateral motion but may easily move rearwardly toward the frame 2.

An elongated angle 17 extends transversely between and is secured to the structural members 3 vertically intermediate the horizontal portion of the members 3 and the bar 9. The angle 17 has a lip 18 secured thereto and extending forwardly and downwardly therefrom. Four bottom chains 19 are respectively secured at the rear ends thereof in horizontally spaced apart relation to the angle 17 between the structural members 3 and extend forwardly and upwardly in a relatively parallel association. The forward ends of the chains 19 are secured to respective helical tension springs 20 which are in turn secured to an anchor member 21 at the bottom of the chute 16. The lip 18 extends forwardly and downwardly beneath the connections of the chains 19 to the angle 17 and thus forms a guide for urging the leading lower transverse edge of a bale upwardly over the angle 17 for entrance into the accumulator. The tension springs 20 are of sufficient strength to prevent excess sagging of the chains 19 with a bale resting thereon, but will advantageously retard bale movement and will allow effective elongation of the outer chains 19 when the baler is making a sharp turn with respect to the accumulator (FIG. 5), thus maintaining the tension of the side chains 13 and 14 for supporting and guiding bales under all operating conditions.

Structural cross members 22 and 23 extend between the forward extensions 10 above the ground and cooperate with a transverse front bumper member 24 for adding rigidity to the front of the frame 2. A transverse angle 25 of substantially shorter length than the distance between the structural members 3 is located generally between the skids 6 near the front of the frame. Chains 26 are respectively secured to opposite ends of the transverse angle 25 and extend forwardly and outwardly terminating in engagement with rear portions of the respective cross members 22 and 23. The chains 26 may be shortened or lengthened by engaging various links thereof in suitable securing anchor members 26'. Spaced apart trailing running straps 27 and 28 of semi-rigid flat stock have the forward ends thereof secured to opposite ends of the transverse angle 25 and trail in parallel relation partly in contact with the ground and partly upwardly suspended by the chains 26 as the accumulator is drawn forwardly. The rear ends 29 of the running straps 27 and 28 are free and terminate at the rear 5 of the frame in contact with the ground. The purpose of the running straps 27 and 28 is to partially support bales contained within the frame so as to permit sufficient friction between the bottom of the bales and the ground to continuously urge the bales rearwardly but not sufficient friction to cause excessive abrasion damage to the bales when they are drawn extensive distances. An adjustment in the length of the chains 26 will cause a slight raising or lowering of the transverse angle 25 for controlling the amount of suppotr provided the bales by the straps 27 and 28.

Guide prongs 30 are secured at one end thereof beneath the horizontal leg of the angle 17 and extend rearwardly towards the interior of the frame 2 in laterally spaced apart relation. The guide prongs 30 are comprised of a hollow tube 31 telescopically receiving a rearwardly extending pointed rod 32 and which is adjustable in length of reward extension by means of a suitable set screw 33. The guide prongs 30 are adapted to cooperate with a bale guide 34 to retard the entry of bales and guide the bales into the frame 2 in the proper relationship. The bale guide 34 comprises spaced apart angles 35 extending upwardly from and secured to the respective structural members 3 by means of U-bolts 36 which permit the bale guide to be adjusted longitudinally of the frame 2 as desired. An axle 37 is rotatably mounted at opposite ends thereof to the upper ends of the angles 35 and extends transversely therebetween spaced above the structural members 3. A depending bar 38 is fixed to and extends downwardly from the axle 37 intermediate the angles 35 and terminates approximately the same height as the horizontal portion of the structural members 3.

A link 39 is fixed to the axle 37 and extends horizontally rewardly of the frame 2 adjacent one of the angles 35. An elongated helical tension spring 40 is fixed at one end thereof to the free end of the link 39 and is anchored at the other end thereof adjacent the respective structural member 3 so as to resiliently urge the depending bar 38 to a downwardly pointed position. A stop 41 is fixed to one end of the axle 37 and engages one leg of an angle 35 to prevent the depending bar 38 from rotating beyond the downwardly extending position under the influence of the spring 40. As further explained hereinafter, the depending bar 38 contacts a bale entering the frame 2 so as to urge the bale into proper position with respect to the frame and other bales entering the accumulator.

Rear upright angles 42 are secured to the rear ends of the structural members 3 and the intermediate bars 9 and are fixed to the skids 6 adjacent the rear thereof. The angles 42 extend upwardly from the horziontial portion of the structural members 3 above the height of two layers of bales in stacked condition as best shown in FIG. 4. A transverse angle 43 is fixed to the upper ends of the angles 42 and extends laterally outwardly therefrom forming wings 44. Structural angles 45 are secured at one end thereof to the wings 44 at positions space outwardly from the angles 42 and extend downwardly and inwardly to positions 46 where the angles 42 meet the skids 6, and are there secured. The structural angles 45 add rigidity to the rear 5 of the frame 2 which is entirely open at the rear except for the transverse angle 43 and structure associated with the gate 47.

Mounting ears 48 are fixed to the respective angles 42 at the upper ends thereof and extend rearwardly past the transverse angle 43. A transversely extending shaft 49 is rotatably mounted at opposite ends thereof on the ears 48 and has links 50 rigidly mounted thereon adjacent the respective mounting ears 48. A bracket 51 is fixed to the shaft 49 intermediate the ends thereof and extends forwardly forming a pivotal connection 52 with an adjusting link 53. The adjusting link 53 has an elongated slot 54 extending therealong and receiving a fastening member 55 therethrough. The member 55 engages an elongated trigger 56 intermediate the ends thereof. The trigger 56 has an upper end 57 pivotally engaged with the bracket 51, however when the fastening member 55 is locked, the bracket 51, adjusting link 53 and trigger 56 form a rigid structure with the trigger normally depending into the path of the upper bale of two stacked bales. It is to be understood that the normal position taken by the trigger 56 is adjustably determined by the position of the fastening member 55 in the slot 54. The rearward movement of the trigger 56 causes the links 50 to pivotally rise about the shaft 49 for reasons noted below.

A shaft 58 is pivotally mounted at opposite ends thereof on the rear ends of the links 50 and has a pair of rods 59 fixed at one end thereto and depending therefrom. A cross bar 60 is fixed to the rods 59 and extends laterally therebeyond to a length generally equal to the distance between the angles 42. A pair of latch members 61 are secured to the respective angles 42 and extend rearwardly thereof at approximately the same level as the intermediate bar 9. The latch members 61 have rearwardly and downwardly sloping upper surfaces 62 which are positioned to engage the opposite end portions 63 of the cross bar 60 when the rods 59 swing downwardly and forwardly about the shaft 58 pivoting on the links 50. The surface 62 abruptly drops at 64 forming a latching area preventing the cross bar 60 from moving rearwardly of the frame 2 unless the bar 60 is lifted. Elongated tension springs 65 are engaged at one end thereof with the links 50 and at the other end thereof to positions 66 on the angles 42. The springs 65 pull the links 50 downwardly to the limit of their travel, which is determined, in this example, by a forwardly extending portion 67 of the links 50 contacting the transverse angle 43 as illustrated in FIG. 4.

In operation, a bale issues from the chute 16 and is guided rearwardly thereof by the flexible chain hitch 12 as shown at 68. Due to the normal slackness of the bottom chains 19, the bale is retarded thereon and does not immediately slide into the accumulator, however the hitch 12 positively guides the bales and no bales can be dropped even when sharp turns are being negotiated. The succeeding bale issuing from the chute 16 force the bale resting on the chains 19 rearwardly into engagement with the guide prongs 30 and the depending bar 38. The bar 38 further prevents immediate entry into the frame 2 and requires urging from a preceding bale whereupon the bar 38 resiliently pivots rearwardly allowing the bale to move downwardly within the frame 2 as illustrated at 69. The lip 18 prevents a bale from snagging on the structure supporting the chains 19 so that rearward movement is smooth. When the bale strikes the ground the bar 38 continues to press thereagainst insuring that the bale is pulled down into a flat posiiton wherein a long side is resting on the ground and the bale is not standing on end.

When the bale strikes the ground the relative movement between the ground and the frame 2 causes it to move rearwardly until it comes to rest against the rods 59 and cross bar 60 which cause the bale to drag along the ground with the frame. The running straps 27 and 28 limit the contact area between the ground and the bale so that only the desired frictional force is applied to the bale. Subsequently, the next bale drops between the guide prongs 30 and bar 38 and comes to rest on the ground in front of the preceding bale with the ends of the two ground engaging bales in contact. The next bale is pushed by a succeeding bale on to the top of the second bale and the bar 38 pivots forwardly and upwardly through a substantially greater angle than previously, allowing the third bale to pass therebeneath on top of the second bale. A further succeeding bale forces a fourth bale through the same path taken by the third bale and the third and fourth bales are thereby urged forwardly until the forward end of the third bale is in alignment with the forward end of the first bale. When this position is achieved the trigger 56 is urged forwardly by the third bale causing the links 50 to rise which in turn raises the rods 59 and cross bar 60.

Raising the cross bar 60 releases same from the latching surface of the latch member 61 permitting the rods 59 and cross bar 60 to swing upwardly under the rearward pressure of the bales as best illustrated in FIG. 3. The trigger 56 also pivots upwardly with the shaft 49 and the four bales are left on the ground in a stacked group as the frame 2 continues to be pulled forward.

The trigger 56 is first to clear the fourth bale and swings downwardly quickly under the force exerted by the springs 65. When the rods 59 clear the fourth bale the links 50 have achieved their normal rearwardly extending position and as the rods 59 swing downwardly the ends 63 of the cross bar 60 engages the upper surface 62 of the latching member 61 forcing the rods 59 upwardly until the surfaces 62 are cleared whereupon the rods 59 and cross bar 60 drop downwardly into latched position. The continued tension of the springs 65 prevent the cross bar 60 from bouncing out of latched condition and the sliding of the cross bar 60 against the horizontal latching member surface 70 helps absorb the energy developed during the downward pivoting of the rods 59 so as to prevent undue shock in relatching.

Vertically extending guide members 71 are secured to the angles 42 to help funnel the stacked bales through the gate opening and prevent snagging the bales on the gate supporting structure as they move rearwardly with respect to the frame. The succeeding or fifth bale is retarded by the chains 19 and the depending bar 38 during the interval when the gate has opened and not yet become completely latched closed. This delay prevents five bales from being ejected rather than the desired four. The fifth bale is subsequently pushed by a succeeding bale into the frame and becomes the first bale of the next group.

Although one form of this invention has been illustrated and described, it is not to be limited thereto except insofar as such limitations are included in the claims.

What I claim and desire to secure by Letters Patent is:

1. A bale accumulator and stacker comprising:
   (a) an elongated frame having a bale receiving front end and a gate supporting rear end and upwardly extending sides spaced apart to receive bales therebetween, hitch means on said front end for attachment to a rear delivery hay baler, said frame including ground contacting means for movably supporting said frame on the ground,
   (b) guide means secured to said frame between said sides and adjacent said front end and extending rearwardly from said front end, a pair of members respectively mounted on said sides and extending upwardly intermediate said front and rear ends, said upwardly extending members terminating above the height of one bale stacked on another,
   (c) a depending member having a lower end, means pivotally mounting said depending member at a position between said upwardly extending members and above the height of one bale stacked on another with said lower end terminating below the height of one bale stacked on another, and means urging said depending member to a downwardly extending position but permitting said lower end to pivot rearwardly and upwardly, said lower end normally terminating in a position spaced rearwardly from said guide means a distance less than the width of a bale whereby said depending member must pivot rearwardly to permit a bale to pass between said guide means and depending member into said frame,
   (d) said guide means and depending member cooperating to retard the entrance of a bale into said frame, said depending member urging the bale to a flat position on the ground within said frame as said frame is drawn forwardly on the ground.

2. The structure as set forth in claim 1 wherein:
   (a) said guide means comprises a plurality of laterally spaced apart prongs extending rearwardly approximately the height of a single bale lying on the ground.

3. The structure as set forth in claim 1 wherein:
   (a) said depending member comprises a bar having a lower end terminating above the height of a single bale.

4. The structure as set forth in claim 1 including:
   (a) adjustable means mounting said upwardly extending members on said frame permitting longitudinal positioning of said depending member along said frame.

5. A bale accumulator and stacker comprising:
   (a) an elongated frame having a bale receiving front end and a gate supporting rear end and upwardly extending sides spaced apart to receive bales therebetween, flexible hitch means on said front end for attachment to a rear delivery hay baler, said hitch means including,
   (b) at least one side chain secured to said frame at said front end adjacent each of said frame sides and extending forwardly therefrom, said side chains being generally parallel and adapted for securing to the chute of a rear delivery hay baler at side positions thereon for drawing said frame along the ground,
   (c) a support extending between said frame sides at said front end, a plurality of bottom chains below said side chains and secured in spaced apart relation to said support and extending forwardly therefrom, said bottom chains being adapted for securing to said chute at bottom positions thereon,
   (d) said side and bottom chains forming a retainer chute for flexibly supporting and guiding a bale issuing from said chute prior to entry into said front end.

6. The structure as set forth in claim 5 wherein:
   (a) said bottom chains are of greater length than said side chains so as to normally remain slack whereby a bale issuing onto said hitch means causes said bottom chains to sag downwardly and thereby require urging from a subsequently issuing bale to enter into said front end.

7. The structure as set forth in claim 5 wherein said hitch means includes:
   (a) a pair of vertically spaced apart side chains secured to said frame at said front end adjacent each of said sides.

8. The structure as set forth in claim 5 wherein:
   (a) said bottom chains each include stretchable tensile means between said frame and said baler chute.

9. The structure as set forth in claim 5 wherein:
   (a) said support extending between said frame sides includes a forwardly and downwardly extending lip for guiding bales thereover and into said front end.

10. A bale accumulator and stacker comprising:
    (a) an elongated frame having a bale receiving front end and a gate supporting rear end and upwardly extending sides spaced apart to receive bales therebetween,
    (b) a pair of chains secured to said frame at opposed positions adjacent said sides near said front end and spaced above the ground, said chains extending inwardly and rearwardly and downwardly into said frame,
    (c) a cross member of shorter length than the distance between said sides and having opposite end portions thereof secured to the rear ends of said chains,
    (d) a pair of elongated semi-rigid flat runners extending longitudinally of said frame and in sliding contact with the ground, the front ends of said runners being secured in spaced apart relation to said cross member for movement with said frame along the ground,
    (e) and means for adjusting the length of said chains for raising and lowering the front ends of said runners.

11. A bale accumulator and stacker comprising:
    (a) an elongated frame having a bale receiving front end and a rear end and upwardly extending sides spaced apart to receive bales therebetween, said rear end including, (b) a rear upright member on each of said sides and extending upwardly a distance greater than two bales stacked one on the other, mounting ears fixed at the upper ends of said rear upright members and extending rearwardly therefrom, a first shaft rotatably mounted between said ears, (c) spaced apart links fixed with respect to said first shaft and normally extedning rearwardly of said mounting ears, a bracket fixed to said first shaft and rotatable therewith, a trigger member mounted on said bracket and normally extending into the frame at a height greater than one bale and less than one stacked on another, said trigger being adapted to rotate said first shaft upon being contacted by a bale, (d) a second shaft extending parallel to said first shaft, and pivotally mounted between said links, rods having one end thereof fixed to said second shaft and depending therefrom to a height less than the height of a bale, a cross bar fixed to said rods and having opposite ends extending outwardly beyond said rods, latch members secured to said rear upright members and having latching areas and downwardly and rearwardly sloping surface for engaging said cross bar ends for lifting said rods into said latching areas and thereby pivoting said links about said first shaft, (e) whereby said trigger upon being urged rearwardly will raise said cross bar to release same from said latching areas for rearward and upward pivoting and said trigger is free to return to normal position prior to sair cross bar returning into contact with said latch member surfaces.

References Cited by the Examiner
UNITED STATES PATENTS

| | | | |
|---|---|---|---|
| 2,689,055 | 9/1954 | Kizer et al. | 214—353 |
| 2,695,490 | 11/1954 | Bohner | 214—353 X |
| 2,971,318 | 2/1961 | Solem et al. | 214—6 |
| 3,163,303 | 12/1964 | Schlake | 214—6 |

FOREIGN PATENTS 242,344  12/1962  Australia.

GERALD M. FORLENZA, *Primary Examiner.*

A. J. MAKAY, *Assistant Examiner.*